July 23, 1929.  D. V. FALLON  1,721,775
COMBINED TRANSFORMER AND CONDUIT BOX COVER
Filed April 30, 1928
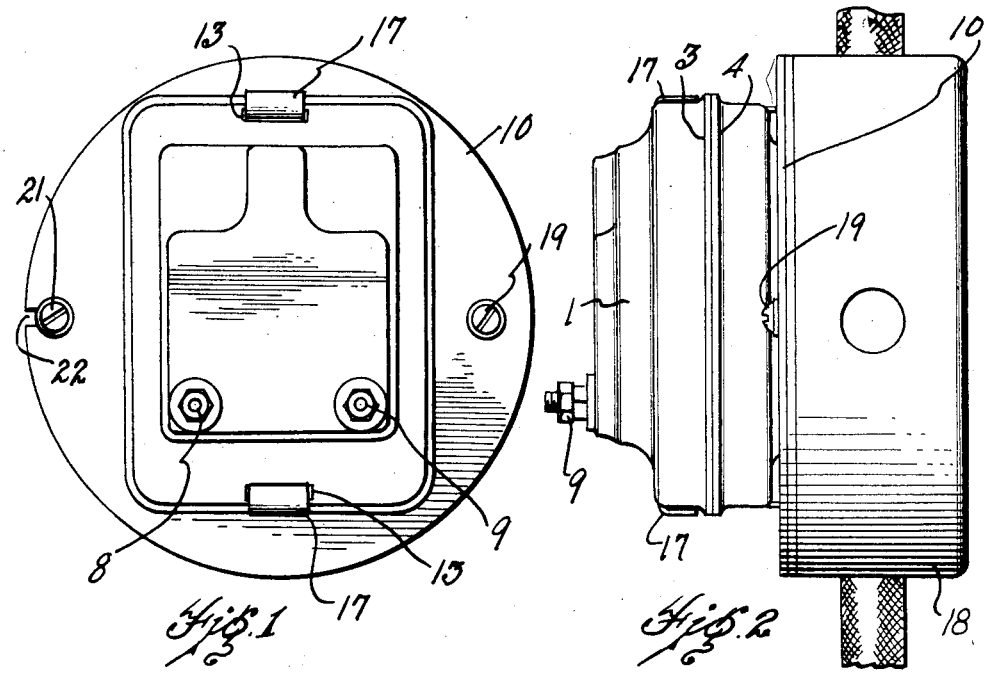
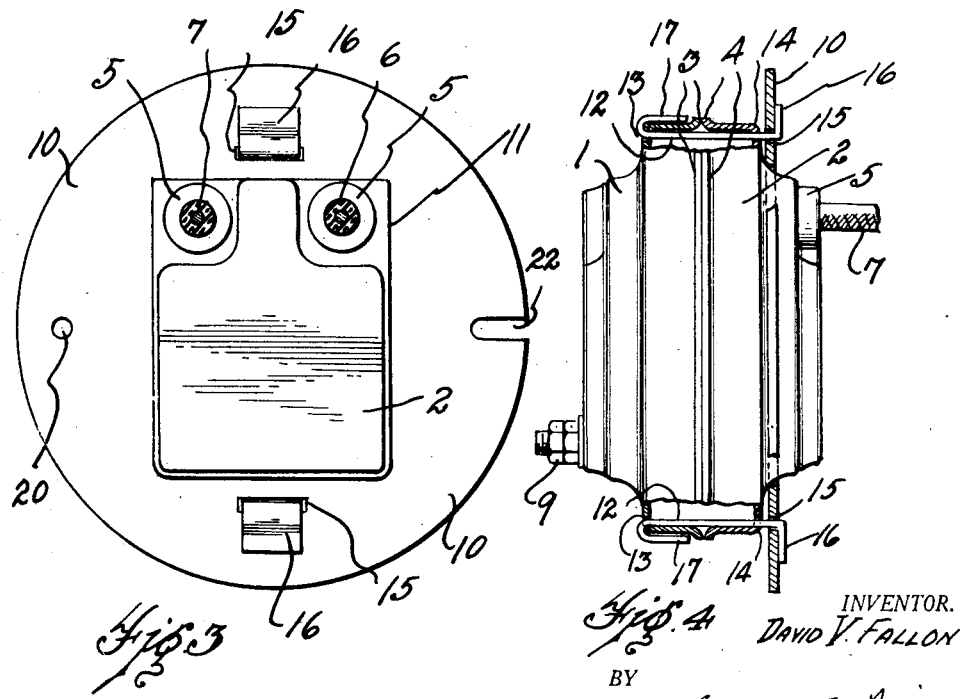
INVENTOR.
DAVID V. FALLON
BY
ATTORNEY.

Patented July 23, 1929.

1,721,775

UNITED STATES PATENT OFFICE.

DAVID V. FALLON, OF DETROIT, MICHIGAN, ASSIGNOR TO DONGAN ELECTRIC MANUFACTURING COMPANY, OF DETROIT, MICHIGAN, A CORPORATION OF MICHIGAN.

COMBINED TRANSFORMER AND CONDUIT-BOX COVER.

Application filed April 30, 1928. Serial No. 273,880.

This invention relates to combined transformers and conduit box covers and the object of the invention is to provide a means for securing a transformer to a conduit box so that the connections of the transformer to the line are entirely enclosed and concealed to eliminate fire hazards.

A further object of the invention is to provide a device of the character described in which a portion of the transformer housing extends through an opening in the cover member and the means for securing the transformer casing to the cover member also secures the two halves of the transformer housing together.

A further object of the invention is to provide a combined transformer and conduit box cover in which the leads from the transformer are concealed within the conduit box and are made extremely short to maintain high efficiency.

These objects and the several novel features of the invention are hereinafter more fully described and claimed and the preferred form of construction by which these objects are attained is shown in the accompanying drawings in which—

Fig. 1 is an elevation of a transformer and conduit box cover secured to the conduit box.

Fig. 2 is a side elevation thereof.

Fig. 3 is a view of the inside of the conduit box cover showing the transformer mounted thereon.

Fig. 4 is a detail showing the method of securing the transformer housing to the cover and securing the two halves of the transformer housing together.

The transformer is mounted in a casing formed in two halves 1 and 2 which are provided with peripheral flanges 3 and 4 about the edge where the two halves of the housing come in contact. A pair of insulating bushings 5 are mounted in the housing half 2 and extend therefrom and the primary leads 6 and 7 extend through these bushings. The secondary terminals or binding posts 8 and 9 shown in Fig. 1 are mounted in the housing part 1 as shown. The conduit box cover 10 is provided with a rectangular aperture 11 shown in Fig. 3 through which the lower part of the housing half 2 including the insulating bushings 5 and the primary leads 6 and 7 extend. In order to secure the two halves 1 and 2 of the transformer housing together and to secure the conduit box cover to the transformer, a metal strip 12 is inserted through apertures 13 and 14 provided therefor at opposite ends of the housing halves 1 and 2 and through an aperture 15 in the cover plate 10. The end 16 of each strap is turned over against the plate 10 as shown in Figs. 3 and 4 and the end 17 of the strap is turned over the adjacent housing half 1 as shown in Figs. 1 and 4. As a strip 12 is provided at each end of the transformer the transformer housing halves are firmly secured together in this manner and the cover plate 10 is firmly secured to the transformer housing.

The transformer with the cover plate 10 secured thereto is then mounted on the conduit box 18 as shown in Figs. 1 and 2 and is secured thereto by the screw 19 extending through the hole 20 in the plate 10 by the screw 21 extending through the notch 22 in the plate 10 as shown in Figs. 1, 2 and 3.

In this manner the primary leads 6 and 7 are brought to close relation with the supply circuit so that only a short connection is required to connect the transformer into the circuit and the connections are all enclosed within the steel conduit box so that they cannot readily be disturbed and to eliminate fire hazards. Also the secondary terminals 8 and 9 are exposed so that in a case of a bell ringing transformer the leads to the bell may be connected to these binding posts.

From the foregoing description it becomes evident that the cover plate may be firmly secured to the transformer housing in a manner to enclose the primary leads within the conduit box to eliminate fire hazards, is of low manufacturing cost and very simple in assembly and provides a device which accomplishes the objects described.

Having thus fully described my invention, its utility and mode of operation, what I claim and desire to secure by Letters Patent of the United States is—

1. In a device of the character described, the combination of a transformer housing formed of two parts, and a conduit box cover plate having an aperture through which one part of the housing partially extends, the portion of the said housing extending through the cover plate being provided with a pair of primary leads extending therefrom and the other housing part carrying connections for the secondary, the housing parts and cover plate being provided with apertures in alignment at each end, and a metal strip extending through each series of apertures and secured over the adjacent housing part and cover plate at the ends.

2. In a device of the character described the combination of a transformer housing consisting of two halves assembled together, a pair of primary leads extending from one of the transformer halves, a conduit box cover having an opening through which a portion of the transformer housing half including the primary leads extends, and a member extending through both halves of the housing and through the conduit box cover plate at each end of the transformer and securing the two halves of the transformer housing and cover plate together.

3. In combination, a conduit box having an open outer side, a cover plate adapted to be secured over the open side of the said box and having an opening therein, a transformer casing part extending partly through the said opening and having primary leads extending therefrom into the conduit box and completely enclosed within the said box and cover, a second transformer casing part and a member at each end of the casing securing the two parts of the casing together and securing the casing to the cover plate.

In testimony whereof I sign this specification.

DAVID V. FALLON